Patented Mar. 21, 1939

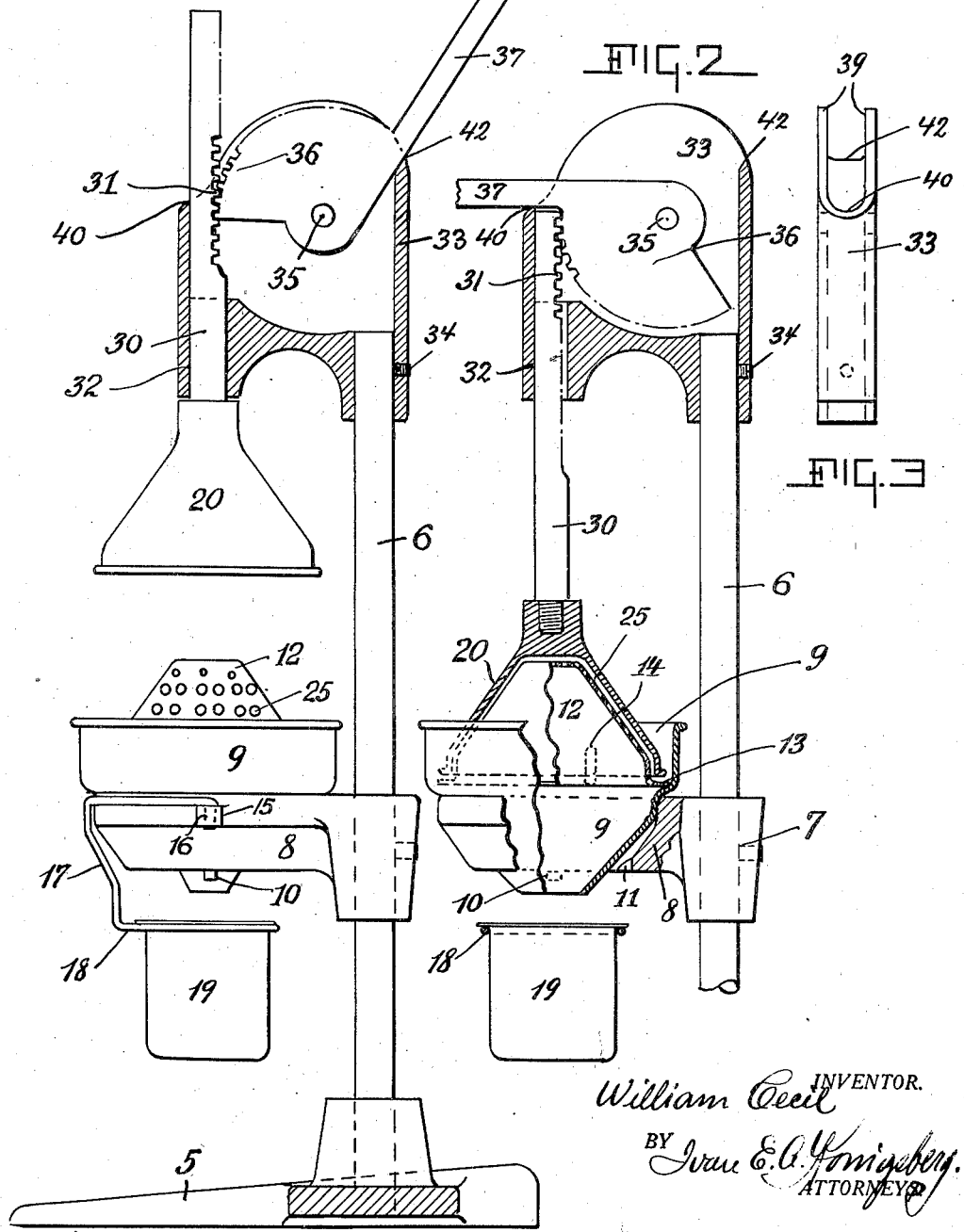

2,151,500

UNITED STATES PATENT OFFICE 2,151,500

FRUIT JUICE EXTRACTOR

William Cecil, New York, N. Y.

Application September 1, 1938, Serial No. 227,947

1 Claim. (Cl. 100—42)

This invention relates to a fruit juice extractor of the type which includes a stand with a stationary and a movable squeeze member, the latter being operable from an upper inactive position into a lower squeezing position with relation to the stationary member and means for operating the movable member. Such fruit juice extractors are used in great numbers in drug stores, soda fountains, restaurants and other places where sturdiness of construction and quickness and ease in operation are prime requisites.

The object of this invention is to provide a fruit juice extractor of very simple sturdy construction including means for quick easy operation. One feature of the invention consists in means for bringing the movable squeeze member by a single stroke into squeezing position. Another feature of the invention is to provide means whereby the squeezing operation is accurately automatically controlled to prevent extraction of the bitter oils from fruit skins and peels. Other objects will appear as this specification proceeds.

Accordingly my invention is embodied in a fruit juice extractor arranged and constructed as hereinafter set forth and as illustrated in the accompanying drawing in which Fig. 1 is a side view of the extractor with parts in section, the movable squeezing member being shown in its upper machine position.

Fig. 2 is a similar view and with parts broken away, the movable squeezing member being shown in squeezing position.

Fig. 3 is a front view of a gear housing shown in the other figures.

Referring to the drawing the fruit juice extractor comprises a supporting structure consisting of a relatively heavy base 5 and an upright post 6. To the latter there is secured at 7 a ring shaped bracket 8 which supports a funnel shaped cup 9. The latter has lugs as at 10 which pass down through slots as at 11 and whereby the cup is detachably locked to the ring bracket in the manner of a bayonet joint. The cup 9 is adapted to receive and support a perforated male squeeze member 12, the latter being provided with a flange 13 which rests in the cup. The member 12 is locked to the cup 9. The flange 13 has cut outs, not shown, which pass down over lugs 14 and thereafter the member 12 is rotated to lock the flange under the lugs in an obvious manner. The male squeeze member 12 and the cup 9 are thus detachably locked to the post 6 and may be removed for cleaning.

The ring bracket 8 has a boss 15 adapted to receive the bent down end 16 of a tumbler holder arm 17. The latter is made of bent wire and forms a ring 18 below the bracket 8. A tumbler 19 rests in the ring 18 and may be swung into juice receiving position as shown, or it may be swung to one side, not shown, away from the bracket 8 so that the tumbler 19 containing the extracted juice may be lifted out of the holder arm. The latter moves in the boss 15 as on a pivot.

The female squeezing member 20 is in the form of an inverted bowl or cup adapted to be moved down upon and enclose the male member 12 as shown in Fig. 2. The walls of the two members are parallel as shown. One half of the fruit is placed upon the member 12 and as the female member is brought down into squeezing position, the fruit is crushed and the juice squeezed out. The juice passes down through the perforations 25 in the member 12 and through the funnel shaped cup 9 into the tumbler 19. The female squeezing member is then raised, the fruit skin or peel removed and the squeezing operation may then be repeated. The parts are so arranged that the female member is lowered only so far as to squeeze the fruit sufficiently to extract all the juice, but not lowered far enough to crush the peel. Hence the bitter oils of the peel are not extracted, an obvious advantage. The means for operating the female squeezing member will now be described.

This member is carried by a rod 30 provided with a rack 31. The rod 30 moves vertically in a bearing 32 in a gear housing 33 secured at 34 to the top of the post 6. Within the gear housing is pivoted on a pin 35 a segmental gear 36 which is in one piece with a handle 37 having a convenient hand knob 38. The gear 36 engages the rack 31 and during operation the gear and handle are guided between the side cheeks 39 of the gear housing 33, which latter also serves to enclose the gearing mechanism and prevent it from becoming wobbly and loose. The parts are so arranged and designed that the gear and rack are engaged with a sufficient number of teeth to prevent the rack from dropping off the gear and whereby a very good operative connection is obtained between these two parts. Furthermore, as seen in Fig. 2, when the handle is moved down into squeezing position it strikes a stop 40 of the gear housing which prevents further downward movement of the handle and the female squeezing member and whereby the latter is automatically stopped and prevented from crushing the peel of the fruit. The weights of the parts are so distributed that when the handle is moved up into normal position as in Fig. 1, it falls by gravity against another stop 42 of the gear housing and keeps the female squeezing member in raised position.

Normally the parts are in the positions shown in Fig. 1. A fruit, for instance an orange, is cut in half and one half part is held by the operator with the peel uppermost on top of the male squeezing member 12. Then with the other hand the operator moves down the handle 37 and thereby lowers the female squeezing member down upon the fruit and squeezes the latter between the two squeezing members. Only one stroke or movement of the handle is necessary to complete the operation which therefore may be accomplished in very little time and without loss of motions. The fruit juice runs down into the tumbler 19 and the handle 37 is then moved back and the female squeezing member raised from the squeezing assembly. A quick movement forward and backward of the handle is all that is necessary. The rack rod 30—31 is under complete firm control all the time and the handle definitely stopped in its two extreme positions.

The juice extractor according to this invention includes as a feature that one part of the straight handle 37 engages the rear stop 42 of the gear housing to definitely limit the upward stroke. Another portion of said handle 37 engages the front stop 40 of the gear housing whereby a definite limit is put upon the downward stroke of the handle to accomplish the juice extracting operation without the operator having to exert any extra care in moving said handle or in exerting any special pressure thereupon. The handle moves through an arc which is less than 180 degrees and more than 90 degrees. The range of movement is such that on the one hand a sufficiently large movement is permitted to accomplish the juice extracting operation, while on the other hand the backward stroke is no greater than is necessary to swing the handle past vertical dead center. The strokes of the handle are therefore limited by said handle engaging the stops in the housing. The gear and rack are therefore not subject to blows or jars at the end of the movements in either direction.

As seen from the drawing the proportions of the extractor are such that it may be conveniently placed rather close to a wall. This is an advantage in lunch rooms where space often is limited and the extractors placed upon narrow shelves. It will also be noticed that looking from the front, the device need not take up more space than the width of the base 5 which actually is slightly more than the diameter of the cup 9, while the upper structure is very flat as is seen from Fig. 3 and takes up very little space. Another point of advantage is that the downward quick movement of the handle takes place in the plane of the central axis of the device. Thus wobbling or straining at pivots and the like is avoided.

I claim:—

In a fruit juice extractor in combination, a base having an upright post, a gear housing secured to the top of said post, said housing having a closed bottom forming a socket to receive said post and a vertically disposed bearing, said housing having an open top formed between two opposed spaced cheeks arising from said socket and bearing, said housing including a lower front stop and an upper rear stop formed between said upstanding cheeks, a male squeezing member on said post below said housing in alinement with said bearing, a movable female squeezing member, a rack rod movably supported in said bearing and carrying said female squeezing member, a segmental gear journaled between said cheeks to move therebetween in engagement with said rack rod, said gear having an integral straight handle movable between said spaced cheeks to actuate said segmental gear to operate said rack rod to bring the female squeezing member from a normal upper inactive position down into operative relation with the male squeezing member to complete the fruit extracting stroke of the female squeezing member and back again, a straight portion of said straight handle contacting said lower front stop of said housing at the limit of the down stroke, another straight portion of said straight handle contacting said upper rear stop of said housing at the limit of the up stroke, whereby said handle may be moved through an arc of less than 180° and more than 90° so as to bring the female squeezing member into operative relation with the male squeezing member to accomplish the juice extracting operation by a single stroke limited by said front stop in the housing.

WILLIAM CECIL.